ated Feb. 17, 1970

3,496,119
WATER-ACTIVATED EPOXY COMPOSITIONS
Ernest E. Weller, Sayreville, and John V. Fitzgerald, Metuchen, N.J., assignors to Tile Council of America, Inc., New York, N.Y., a corporation of New York
No Drawing. Filed July 21, 1966, Ser. No. 566,753
Int. Cl. C08g 30/14
U.S. Cl. 260—2      13 Claims

ABSTRACT OF THE DISCLOSURE

This invention provides an adhesive composition comprising (a) a primary polyamine carbamate hardener, (b) an epoxy resin having at least 2 epoxy groups,

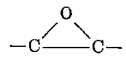

per molecule, and (c) an hydroxide compound activator selected from the group consisting of alkali metal hydroxides and alkaline metal hydroxides.

---

The present invention relates to adhesive compositions. The invention relates to novel, stable, unitary compositions comprising epoxy resin, a polyamine carbamate hardener, and a hydroxide activator compound. More particularly, the present invention relates to an adhesive composition comprising an epoxy resin, a primary polyamine carbamate hardener, and an alkali or alkaline metal hydroxide activator. Specifically, the invention relates to an adhesive composition which is stable in the absence of moisture but which when placed in contact with water reacts to form a polymerized product. When the composition is placed in contact with water a reaction occurs between the polyamine carbamate hardener and the hydroxide activator and the water to decompose the carbamate hardener to release free amine hardener which released free amine is made available to cross link with the epoxy resin and to cause polymerization of the resin and form a polymerized product of high bond strength and chemical resistance.

The epoxy, polyamine carbamate, and hydroxide activator though mixed intimately are completely stable in the absence of moisture.

The compositions of this invention, however, can be made functional and react by being placed in contact with environmental moisture i.e. vapor from the atmosphere or water from the substrata, or water can simply be added to the composition.

The epoxy resin, primary polyamine carbamate hardener and hydroxide activator compositions of the present invention can be used as or to make adhesives, mortars, grouts, castables, coatings and paints.

The compositions of the present invention are particularly useful in areas where moist or wet conditions exist since environmental moisture can be utilized for hardening the composition. Heretofore, primary polyamine carbamates have not been adapted to be made functional by contact with environmental moisture or by the mere addition of water either before or after applying the adhesive to a surface to a composition containing the primary polyamine carbamate.

It was found that unitary compositions comprising a primary polyamine carbamate hardener and an epoxy resin could be made functional merely by bringing the composition into contact with water, if there was first added to the composition an activator selected from groups consisting of alkali and alkaline metal hydroxides.

Accordingly, one object of this invention is to provide water-activated and water-vapor-activated epoxy resin compositions.

A second object is to provide epoxy resin systems capable of being used in wet or moist areas.

A third object is to provide epoxy resin systems of the truly one-component type which are activatable by the moisture available solely from the surroundings.

Another object is to provide such systems in a liquid form, applicable with a brush in thin layers which exhibit extreme stability in the absence of water but which are curable on exposure to water.

Another object is to provide liquid epoxide systems which may be blended with water-containing systems to enhance final properties.

Another object is to provide water-activatable epoxy systems which do not contain an appreciable amount of released $CO_2$, which $CO_2$ can cause undesirable foaminess.

Still another object is to provide epoxy resin systems which after being made functional by contact with water cure to a dense, bubble-free polymeric material.

Still another object is to provide an epoxy resin system which can be made functional by contact with water which exhibit excellent working times but do not exhibit prolonged cure times.

Still other objects will be obvious from the following description and examples.

In accordance with this invention epoxy resin systems are provided which consist of carbamates of primary polyamine compounds, an epoxy resin and a hydroxide activator which causes liberation of free amine from the carbamate upon addition of water to the composition. Conventional fillers, pigments, diluents and extenders commonly employed in epoxy resin systems may also be utilized in the compositions.

It has now been discovered that reactive amino compounds suitable for curing epoxy resins and which contain in their structure only primary amine groups form carbamates with carbon dioxide which are relatively very stable and which generally do not at ambient temperature decompose on the addition of water to release free amine hardener. However, when hydroxide compounds of the present invention are included, the addition of water causes certain reactions to take place which liberate free amine and cause subsequent crosslinking and polymerization of the epoxy resin.

The amino compounds preferred for carbamation and subsequent use according to this invention include primary amino compounds having the formula, $R—(NH_2)_n$, where R may be aliphatic, aromatic, heterocyclic, etc. R may contain 2 to 30 carbon atoms.

Suitable polyamine compounds are ethylene diamine, propylenediamine, butylenediamine, pentylenediamine, hexylenediamine, nonylenediamine, decylenediamines, aromatic polyamines such as meta-, ortho- and para-phenylenediamines, 1,4-naphthalenediamine, 1,4-anthradiamine, 3,3′-biphenyldiamine, xylenediamine and so on.

The primary polyamine carbamate hardeners usable in this invention are formed by reaction of anhydrous carbon dioxide with the anhydrous primary polyamines described herein. In its simplest form, the reaction can be carried out by bubbling carbon dioxide through the anhydrous liquid primary amine or solid primary amine compound. Generally an excess of carbon dioxide is used. The end of the reaction is reached when the initial exothermic reaction ceases and the temperature starts to drop. The products generally separate as crystalline solids or oily liquids which may crystallize on standing. Other methods, such as by reaction with soluble carbonates, may be resorted to for forming carbamates of the primary polyamines.

The polyamine carbamate reaction products formed are believed to be a mixture of about equal amounts of products having the following structures:

I. 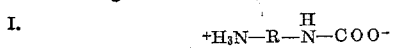

II. 

Such compounds are relatively stable in epoxy resins, even in the presence of water. However, we have discovered that the free amine, $H_2N-R-NH_2$, is liberated if a hydroxide compound is present. The reaction shown below occurs when $NH_4OH$, for example, is added to a primary polyamine carbamate solution.

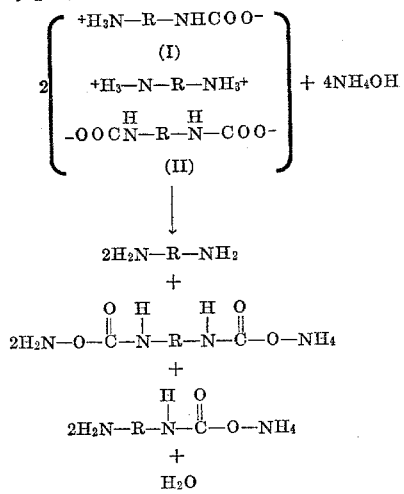

The free amine, $H_2N-R-NH_2$, reacts readily to cause cross-linking and polymerization of the resin, with the epoxy resin.

The hydroxide activator compounds that can be used in accordance with the present invention comprise alkali and alkaline metal hydroxide compounds. Suitable hydroxide compounds that can be used are $Ca(OH)_2$, $NH_4OH$, $NaOH$, $KOH$, $LiOH$, $Mg(OH)_2$ and $Sr(OH)_2$.

The resinous epoxides suitable for use in the present invention comprise those compounds having at least two epoxy groups, i.e., at least two

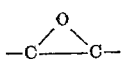

groups per molecule. The polyepoxides may be saturated or unsaturated, cycloaliphatic, aromatic, heterocyclic, or preferably aliphatic, and may be substituted if desired with substituents such as chlorine atoms, hydroxyl groups, ether radicals, and the like.

Examples of the polyepoxides include, among others, the diacetate of epoxidized triglycerides as epoxidized glycerol trioleate and epoxidized glycerol trilinoleate, glycerol dioleate, 1,4-bis(2,3-epoxypropoxy) benzene, 1,3-bis(2,3 - epoxypropoxy) benzene, 4,4' - bis(2,3 - epoxypropoxy) diphenyl ether, 1,8 - bis(2,3 - epoxypropoxy)-octane, 1,4-bis(2,3-epoxypropoxy)-cyclohexane, 4,4'-bis-(2 - hydroxy-3,4-epoxybutoxy)-diphenyldimethylmethane, 1,3-bis(4,5-epoxypentoxy)-5-chloro-benzene, 1,4 - bis(3,4-epoxybutoxy)-2-chlorocyclohexane, 1,3-bis(2 - hydroxy-3,4-epoxybutoxy) benzene, 1,4-bis and (2-hydroxy-4,5-epoxypentoxy) benzene.

Other examples include the epoxy polyethers of polyhydric phenols obtained by reacting a polyhydric phenol with a halogen containing epoxide in an alkaline medium. Polyhydric phenols that can be used for this purpose include, among others, resorcinol, catechol, hydroquinone, methyl resorcinol, or polynuclear phenols, such as 2,2-bis (hydroxyphenyl) propane (bisphenol A), 2,2-bis(4-hydroxyphenol) butane, 4,4'-dihydroxybenzophenone, bis(4-hydroxyphenyl) ethane, 2,2-bis(4-hydroxy-phenol) pentane, and 1,5-dihydroxynaphthalene. The halogen-containing epoxides may be further exemplified by 3-chloro-1, 2-epoxybutane, 3-bromo-1, 3-epoxyhexane, 3-chloro-1, 2-epoxyoctane, and the like.

Preferred polyepoxides of this type are the glycidyl polyethers of dihydric phenols produced by this method from dihydric phenols and epichlorohydrin. The monomer products of this type may be represented by the general formula:

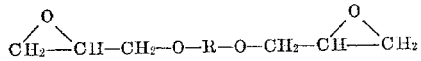

wherein R represents a divalent hydrocarbon radical of the dihydric phenol. The polymeric products will generally not be a single simple molecule but will be a complex mixture of glycidyl polyethers of the general formula:

wherein R is a divalent hydrocarbon radical of the dihydric phenol and $n$ is an integer of the series 0, 1, 2, 3, etc. While for any single molecule of the polyether $n$ is in integer, the fact that the obtained polyether is a mixture of compounds causes the determined value for $n$ to be an average which is not necessarily zero or a whole number. The polyethers may in some cases contain a very small amount of material with one or both of the terminal glycidyl radicals in hydrated form.

The aforedescribed glycidyl polyethers of the dihydric phenols may be prepared by reacting the required proportions of the dihydric phenol and the epichlorohydrin in an alkaline medium. The desired alkalinity is obtained by adding basic substances, such as sodium or potassium hydroxide, preferably in stoichiometric excess to the epichlorohydrin. The reaction is preferably accomplished at temperatures within the range of from 50° C. to 150° C. The heating is continued for several hours to effect the reaction and the product is then washed free of salt and base.

These epoxy resins are available in several forms varying from a viscous liquid to a solid resin. Especially suitable are those resins which are liquid or near their softening point at room temperature.

Typical of the epoxy resins which may be employed are the epichlorohydrin-bis-phenol type sold under the trademarks "Epon Resins" (Shell Chemical Corporation), "Gen Epoxy" (General Mills), "DER Resins" (Dow Chemical Company), "Araldite" (Ciba), "ERL Resins" (Bakelite Corporation), "Epi-Rez" (Jones Dabney), and "Epiphen" (The Borden Company).

Another group of polyepoxides that may be used comprise the glycidyl ethers of novalac resins, which resins are obtained by condensing an aldehyde with a polyhydric phenol. A typical member of this class is the epoxy resin formed from formaldehyde 2,2-bis(5-hydroxyphenol)propane novalac resin which contains as predominant constitutent the substance represented by the formula

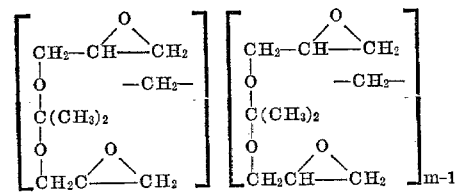
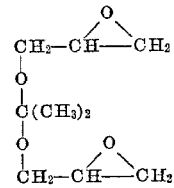

wherein $m$ is a value of at least 1.0.

Another group of polyepoxides include the glycidyl polyethers of a polyhydric phenol which has two hydroxyaryl groups separated by an aliphatic chain of at least six carbon atoms in the chain and with the chain being attached by carbon-to-carbon bonding to a nuclear atom of the hydroxyl aryl groups. Suitable phenols used for preparing these resins comprise those obtained by condensing phenol with a phenol having an aliphatic side chain with one or more olefinic double bonds positioned in the chain so the required separating atoms are present between two hydroxyphenol groups of the resulting polyhydric phenol. Cardanol, obtainable in known manner from cashew nut shell liquid, is a convenient source of phenols containing such side chain.

Examples of the polymeric-type polyepoxides include the polyepoxypolyhydroxy polyethers obtained by reacting, preferably in an alkaline medium, a polyhydric alcohol or polyhydric phenol with a polyepoxide, such as the reaction product or glycerol and bis(2,3-epoxypropyl)ether, the reaction product of sorbitol and bis(2,3-epoxy-2-methylpropyl)ether, the reaction product of pentaerythritol and 1,2-epoxy-4,5-epoxypentane, and the reaction product of bis-phenol and bis(2,3-epoxy-2-methylpropyl)ether, the reaction product of resorcinol and bis(2,3-epoxypropyl)ether, and the reaction product of catechol and bis(2,3-epoxypropyl)ether.

Other ployepoxide compounds include the polymers and copolymers of the epoxy-containing monomers possessing at least one polymerizable ethylenic linkage. When this type of monomer is polymerized in the substantial absence of alkaline or acidic catalysts, such as in the presence of heat, oxygen, peroxy compound, actinic light, and the like, they undergo additional polymerization at the multiple bond leaving the epoxy group unaffected. These monomers may be polymerized with themselves or with other ethylenically unsaturated monomers, such as styrene, vinyl acetate, methacrylonitril, acrylonitrile, vinyl chloride, vinylidene chloride, methyl acrylate, methyl methacrylate, diallyl phthalate, vinyl allyl phthalate, divinyl adipate, chlorallyl acetate, and vinyl methallyl pimelate. Illustrative examples of these polymers include poly(allyl 2,3-epoxy-propyl ether), poly(2,3-epoxypropyl crotonate), allyl 2,2-epoxypropyl etherstyrene copolymer, methallyl 3,4-epoxybutyl etherallyl benzoate copolymer, poly(vinyl 2,3-epoxypropyl ether), allyl glycidyl ether-vinyl acetate copolymer and poly(4-glycidyloxystyrene).

Another group of polyepoxides include the epoxy esters of polybasic acids, such as diglycidyl phthalate and diglycidyl adipate, diglycidyl tetrahydrophthalate, diglycidyl maleate, and the like.

Particularly preferred members of the above-described group comprise the polymers of the 2-alkenyl glycidyl ethers having a molecular weight between 300 and 100 and an epoxy equivalency greater than 1.0 and preferably between 1.2 and 6.0.

Other polyepoxides include the polyepoxy polyethers comprising ethers of epoxy alcohols and polyhydric alcohols such as obtained by reacting, preferably in the presence of an acid-acting compound as hydrofluoric acid, polyhydric alcohols with epichlorohydrin or dichlorohydrins and then dehydrochlorinating the resulting product in the presence of an alkaline component. Examples of polyhydric alcohols that may be used for this purpose include, among others, 1,2,6-hexanetriol, 1,5-pentanediol, butylene glycol, glycerol, sorbitol, manitol, pentaerythritol, polyallyl alcohol, polyvinyl alcohol, trimethylolpropane, bis(4-hydroxycyclohexyl)dimethylmethane, 1,4-dimenthylolbenzene, and the like; polyhydric ether alcohols as triglycerol and dipentaerythritol; polyhydric thioethers, such as 2,2'-dihydroxydiethyl sulfide and 2,2'-2,3'-tetrahydroxy dipropyl sulfide; mercapto alcohols as alpha-monothioglycerol, alpha,alpha' - dithioglycerol; polyhydric alcohol partial esters such as monostearin, pentaerythritol monoacetate and the like; and halogenated polyhydric alcohols as the monochloride of pentaerythritol, monochloride of sorbitol, monochloride or glycerol, and the like.

Particularly preferred members of this group comprise the glycidyl polyethers of aliphatic polyhydric alcohols containing from 2 to 10 carbon atoms and having from 2 to 6 hydroxyl groups and more preferably the alkane polyols containing from 2 to 8 carbon atoms and having from 2 to 6 hydroxyl groups. Such products preferably have an epoxy equivalency greater than 1.0, and still more preferably between 1.1 and 4 and a molecular weight between 300 and 1000.

The compositions of this invention are prepared by mixing together the epoxy resin, the primary polyamine carbamate hardener and the hydroxide compound activator in the proper proportions to release sufficient free amine for hardening of the epoxy resin. The relative amount of the respective components will depend on the particular materials used and the purpose of the adhesive composition.

Other conventional additives such as extenders, diluents, fillers and pigments may be incorporated as desired. Where the systems are liquid the total filler and pigment added should be in the range of 40–80 percent based on the total weight of the composition.

Among these resinous modifiers usable in this invention may be mentioned the phenolic resins, such as aniline formaldehyde resins; urea resins, such as urea formaldehyde resins; melamine resins, such as melamine formaldehyde resins; polyester resins, such as those produced from polybasic acids and polyhydroxyl alcohols, and which may contain free carboxyl groups and/or aliphatic hydroxyls capable of reacting with the epoxy resins; vinyl resins such as vinyl chloride, vinylidene chloride, and the like; isocyanate resins (polyurethanes), characterized by the extremely reactive —N—C—O radical, which is capable of reacting with hydroxyl groups present in the epoxy resin chain, typical of which are the monomeric diisocyanates, such as tolylene diisocyanate, diphenyl methane 4,4'-diisocyanate, and 3,3'-butolylene 4,4'-diisocyanate, fluorocarbon resins, such as polytetrafluoroethylene, polytrifluoromonochloroethylene, and the like, and silicone resins. The addition of such resinous modifiers is well understood in the art. The resinous modifiers may vary from about 1 to about 100 percent or more, by weight, based on the weight of the epoxy resin.

Suitable finely divided inert solid materials for use with the epoxy resins include fillers, such as asbestos, albalith, silica, mica, flint powder, quartz, cryolite, calcium sulfate, portland cement, limestone, atomized alumina, barytes, talc, pyrophyllite, diatomaceous earth, and other like materials. Also may be mentioned pigments, such as titanium dioxide, cadmium red, carbon black, aluminum powder, and the like.

Suitable other colorants may be added to the epoxy resin if desired. Typical of these are: National Fast Red, Calco Condensation Green A.Y., Calco Condensation Blue, Bismark Brown, Blue Lake (13% Ponsal Blue, 10% aluminum hydrate and 77% blanc fixe), Krebst BP–179–D, Blue Lake Krebs BP–258–D, Lithol Tower, Chrome Yellow, Iron Blue, Milari Blue, Monastral Green, Maroon Toner, Chrome Green, Chrome Orange, Iron Oxide Reds, Aluminum Powder, and flatting agents like diatomaceous silica and silica aerogel. The color materials should be selected, however, so as to be non-reactive with the epoxy resins and other ingredients at atmospheric temperature, as otherwise this might cause poor storage stability and also affect the retention of adhesiveness.

The finely divided inert solid materials suitable for use herein may have an average particle size ranging between about 40 mesh and 600 mesh (U.S. Std. Series). The exact size of the inert finely divided solid materials will depend upon the particular application of the compositions.

The following examples are included for further clarification of this invention and are not meant to be limiting in any way. Weight parts refer to grams.

EXAMPLE 1

In this example ethylene diamine carbamate purchased under the trade name Diek #2 was combined with a liquid epoxide resin having an epoxide equivalent of about 190 and a viscosity of 100–160 poises at 25° C. This epoxide resin was of the bisphenol A and diglycidyl ether type purchased under the trade name Epon 828.

The ethylene diamine carbamate and liquid epoxy were intimately mixed to form smooth paste in the following concentration:

1 reactive equivalent of epoxy to 3 reactive equivalents of carbamate and 2 reactive equivalents of $Ca(OH)_2$.

To the mixture was added an amount of water equal to 30% based on the weight of the epoxide.

The resultant mixture was a smooth, viscous fluid having an opaque appearance.

After 18 hours the mixture had gotten hard and was firmly bonded to its container.

EXAMPLE 2

In this example mixtures of 1 equivalent of the epoxy resin of Example 1 and 3 equivalents of ethylene diamine carbamate were mixed with 3 equivalents of various hydroxides and the liberation of free amine determined by the resultant cure noted after addition of water.

(a)

| | Part by weight |
|---|---|
| Epoxy resin | 20.0 |
| Carbamate | 8.2 |
| $Mg(OH)_2$ | 8.7 |
| Water | 6.0 |

(b)

| | |
|---|---|
| Epoxy resin | 20.0 |
| Carbamate | 8.2 |
| NaOH | 12.0 |
| Water | 6.0 |

(c)

| | |
|---|---|
| Epoxy resin | 20.0 |
| Carbamate | 8.2 |
| $Al(OH)_3$ | 7.8 |
| Water | 5.0 |

(d)

| | |
|---|---|
| Epoxy resin | 20.0 |
| Carbamate | 8.2 |
| $NH_4OH$ (aqueous) | 37.5 |

(No water added due to aqueous ammonia.)

(e)

| | |
|---|---|
| Epoxy resin | 20.0 |
| Carbamate | 8.2 |
| LiOH | 7.2 |
| Water | 6.0 |

(f)

| | |
|---|---|
| Epoxy resin | 20.0 |
| Carbamate | 8.2 |
| KOH | 16.8 |
| Water | 8.0 |

All of the above mixtures with the exception of (c), which is $Al(OH)_3$, exhibited good hardening in about 18 hours. (c) remained a fluid mass and showed no sign of hardening after several days.

EXAMPLE 3

A series of mixtures was made as in Example 2 but in this series the carbamate used was hexamethylene diamine carbamate and it was purchased under the trade name Diak #1.

Similar results were obtained with all of the alkaline substances except $Al(OH)_3$ causing free amine to be liberated and subsequent polymerization. Again the $Al(OH)_3$ failed to cause any reaction.

EXAMPLE 4

Two epoxy resins were blended for use in this example.

42.5 weight parts of a low viscosity, aliphatic polyepoxide, Epon 871, used to impart flexibility which has an epoxide equivalent 390–470, were blended with 70.0 weight parts of a second flexibilizing resin, Epon 872, which has an epoxide equivalent of 650–750.

To this blend was added:

| | Parts by weight |
|---|---|
| Diak #2 | 16 |
| $Ca(OH)_2$ | 24 |
| Water | 10 |

After thorough mixing for about 5 minutes a casting 1″ x 6″ x ¼″ was poured. After about 24 hours the casting was removable from the mold. It was extremely flexible and could be twisted and bent in almost every way without damage.

The casting remained flexible even after 2 months room temperature aging.

EXAMPLE 5

This example shows the definite advantage of increased working time derived from the invention herein disclosed. The following compositions were blended, packed in styrofoam packs insulated by burying them in expanded vermiculite and the exotherm for each recorded by use of thermocouples versus time. The conditions consequently are only partially adiabatic permitting a temperature rise to a point where heat loss equals the heat generated by the polymerization and then gradual cooling by loss of heat to the insulation.

(1)

Control:

| | Parts by weight |
|---|---|
| Ethylene diamine | 10 |
| Epon 828 | 100 |

(2)

| | |
|---|---|
| Ethylene diamine carbamate | 41 |
| Epon 828 | 100 |
| $Ca(OH)_2$ | 60 |
| Water | 20 |

(3)

Control:

| | |
|---|---|
| Ethylene diamine | 10 |
| Epon 828 | 100 |
| $Ca(OH)_2$ | 60 |
| Water | 20 |

The graph below illustrates how the maximum exotherm is retarded from about 20 minutes to 80 minutes by addition of water and $Ca(OH)_2$ but it further shows an additional 100 minutes of pot life obtainable by use of the herein disclosed carbamate system. See curves in graph #1.

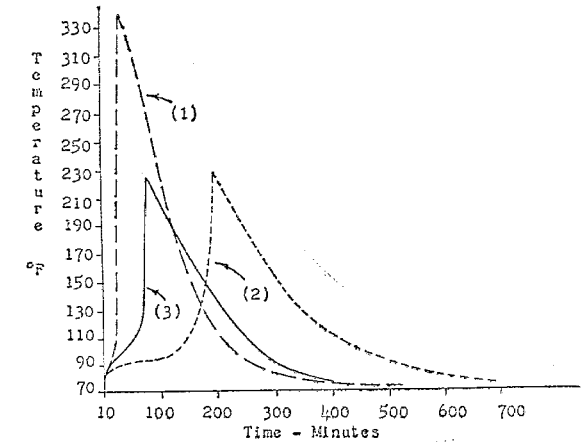

EXAMPLE 6

The following composition was blended for use as a starting point adhesive.

| | Parts by weight |
|---|---|
| Epoxy resin of Example 1 | 50.0 |
| Ethylene diamine carbamate | 20.5 |
| Ca(OH)$_2$ | 30.0 |
| Phenyl glycidyl ether | 4.0 |

The phenyl glycidyl ether was added to reduce viscosity. After careful and thorough blending of the components the composition was applied to a piece of wallboard (gypsum) with a 3/32 inch notched trowel. Absorptive wall tile which had been soaked in water for 15 minutes and allowed to drain for 15 minutes were set in the trowelled adhesive.

After 18–20 hours the bond effected by the water obtainable from the tile was so strong that removal of the tile was only possible by destruction of the wallboard.

This example points out that water need not be added directly to the composition but can be obtained from the surroundings.

EXAMPLE 7

The composition of Example 6 was used in this example again without the addition of water.

A 1/8" coating was applied to a wet cinder block and similarly to a dry cinder block.

Hardening of the coating on the wet cinder block was noted in about 48 hours. The hardening of the coating on the dry cinder block was slower and was taking place due to moisture from the air.

After several days full cure was effected on the dry cinder block by the application of water with a brush. The water did not adversely affect the appearance of the coating but accelerated cure which was already taking place.

A similar coating made from this composition was put onto a dry absorptive wall tile and placed in a 100% humidity cabinet and cured to a hard polymeric material in about 30 hours.

EXAMPLE 8

In this example two epoxy resins of the epoxy novolac type were used in conjunction with the conventional diglycidyl ether type.

In composition (a) Epon 154, which has a viscosity of 350–700 at 52° C., a weight per epoxide of 176–181 and a density of 1.23, was combined in an equal amount with Epon 828 (the epoxide resin of Example 1).

Suitable amounts of ethylene diamine carbamate and Ca(OH)$_2$ were added and the mixture activated by the addition of about 13% water based on the total weight of reactive components.

Castings of this mixture cured to a hard polymer in 20 hours.

Similarly in composition (b) Epon 152, which has a viscosity of 14–20 poises at 52° C., a weight per epoxide of 172–179, and a density of 1.21, was combined in an equal amount with Epon 828.

This composition was cured in a like manner as composition (a) and also was a very hard polymeric solid after 20 hours.

Some advantage should be realized by the incorporation of the novalac epoxies due to their high functionality which is said to enhance chemical resistance and high temperature properties.

The compositions prepared according to this invention are stable, water, water vapor or humidity curable mixtures which fulfill the objectives as set forth and are usable as adhesives, grouting or filleting materials, mortars, coatings for dry or damp surfaces, caulking compounds, protective membranes, polymeric additives for hydraulic cements such as portland cement to impart improved physical and chemical properties and the like.

The invention is not to be limited to the above description nor to the examples which are given merely as illustrative of the invention. Departures and variations of the invention which occur to those skilled in the art are to be considered within the scope of the present invention. The scope of the invention is to be construed by the accompanying claims.

What is claimed is:

1. An epoxy resin composition which comprises:
   (a) 5 to 7 parts by weight of a primary polyamine carbamate hardener;
   (b) 2 to 5 parts by weight of an epoxy resin having at least two epoxy groups,

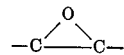

per molecule; and
   (c) 3 to 4 parts by weight of a hydroxide compound activator selected from the group consisting of NaOH and Ca(OH)$_2$.

2. The composition of claim 1 and water.

3. An adhesive composition adaptable to be hardened by contact with moisture which comprises,
   (a) 5 to 7 parts by weight of a primary polyamine carbamate having the structures

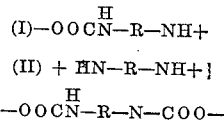

wherein R is a hydrocarbon selected from the group consisting of alkyl, aromatic and heterocyclic;
   (b) 2 to 5 parts by weight of an epoxy resin having at least two epoxy groups

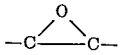

per molecule; and
   (c) 3 to 4 parts by weight of a hydroxide compound activator selected from the group consisting of NaOH and Ca(OH)$_2$, and
   (d) Water.

4. The composition of claim 3 wherein said water comprises atmospheric moisture.

5. The composition of claim 3 wherein said water comprises substrata moisture.

6. A process for forming an adhesive resin composition which comprises admixing:
   (a) 5 to 7 parts by weight of a polyamine carbamate hardener,
   (b) 2 to 5 parts by weight of an epoxy resin having at least two epoxy groups,

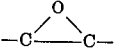

per molecule; and
   (c) 3 to 4 parts by weight of a hydroxide compound activator selected from the group consisting of NaOH and Ca(OH)$_2$; and
   (d) contacting said composition with a sufficient amount of water to initiate a chemical reaction which decomposes said carbamate to release free amine hardener; and
   (e) said amine hardener entering into a cross-linking reaction with said epoxy resin and polymerizing said resin.

7. The process of claim 6 wherein the water is atmospheric moisture.

8. The process of claim 6 wherein the water is provided by tile which has been soaked in water and allowed to drain before being contacted with the composition.

9. The process of claim 8 wherein the reaction is effected by at least one of the following means, water addition before application, by moisture provided after application by spraying, brushing, sponging, by the relative humidity in the atmosphere and by the surface or substrate over which the coating is applied.

10. The process of claim 9 wherein the reaction is effected by water addition by spraying water onto a layer of said composition.

11. The process of claim 9 wherein the reaction is effected by water addition from the surface onto which said composition is applied.

12. A method for applying an adhesive coating to a surface which comprises mixing
(a) 5 to 7 parts by weight of a polyamine hardener,
(b) 2 to 5 parts by weight of an epoxy resin having at least two epoxy groups

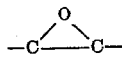

per molecule; and
(c) 3 to 4 parts by weight of a hydroxide compound activator selected from the group consisting of NaOH and Ca(OH)$_2$,
(d) applying a coating of said composition to a surface, and
(e) contacting said composition after being applied to said surface with water.

13. The process of claim 12 wherein said water is applied by one of the following methods spraying, brushing, sponging, from the atmosphere, and from the surface.

References Cited

UNITED STATES PATENTS

| | | |
|---|---|---|
| 2,924,580 | 2/1960 | Phillips et al. |
| 3,275,587 | 9/1966 | Weller et al. _____ 260—29.2 |

MURRAY TILLMAN, Primary Examiner

J. C. BLEUTGE, Assistant Examiner

U.S. Cl. X.R.

117—62.1, 161; 156—71, 330; 260—18, 29.2, 29.6, 37, 47, 59, 78.4, 88.3, 830, 831, 834, 835, 836, 837

UNITED STATES PATENT OFFICE
CERTIFICATE OF CORRECTION

Patent No. 3,496,119                              February 17, 1970

Ernest E. Weller et al.

It is certified that error appears in the above identified patent and that said Letters Patent are hereby corrected as shown below:

Column 3, line 7, the formula should appear as shown below:

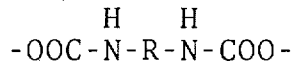

same column 3, lines 26 and 27, the formula should appear as shown below:

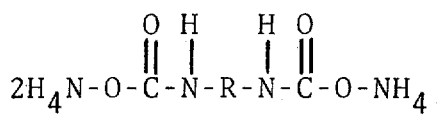

Column 4, line 23, "in" should read -- an --. Column 7, line 15, after "epoxy" insert -- resin --. Column 10, line 26, "(II) + HN-R-NH+]" should read -- (II) + HN-R-NH+ --.

Signed and sealed this 1st day of December 1970.

(SEAL)
Attest:

EDWARD M. FLETCHER, JR.                   WILLIAM E. SCHUYLER, JR.
Attesting Officer                            Commissioner of Patents